: 2,728,715
Patented Dec. 27, 1955

2,728,715

WASHING SILICA GEL WITH AN AQUEOUS SOLUTION CONTAINING ALKALI OR ALKALINE EARTH BEFORE ADSORPTION

Louis D. Rampino, Associated, Calif., assignor to Tide Water Associated Oil Company, San Francisco, Calif., a corporation of Delaware No Drawing. Application May 18, 1951,
Serial No. 227,100

6 Claims. (Cl. 196—147)

The present invention relates to a refining process for the separation of hydrocarbons from each other and/or from other substances with which they may be in common solution. More particularly, it relates to an adsorption separation process wherein non-catalytic silica gel is used as the adsorbent. It further relates to the preparation and use of a silica gel adsorptive medium with catalytic activity eliminated by the addition thereto of small amounts of selected ions. In a specific embodiment the invention relates to the removal by selective adsorption of undesired components from petroleum fractions.

For several years, silica gel and similar materials have been proposed for use in separation processes based on chromatographic adsorption principles. Recently, there has developed considerable industrial utilization of various chromatographic adsorption processes for the separation of mixtures, including those containing hydrocarbons which are commonly encountered in the petroleum industry. In general, these processes comprise contacting the materials to be separated into components or fractions thereof with silica gel, usually by means of pressurized or gravity flow through some form of column, and then removing the separated fractions therefrom.

Since many of the substances in common solution vary in adsorption affinity to the adsorbent used, these components are adsorbed in an order corresponding to the decrease in individual attraction to the surface of the adsorbing medium. The adsorbed materials can then be progressively removed from the column by a continuous processing of feed stock through the column to some predetermined end point. Another method of removal is by elution in fractions, as desired, by means of certain polar eluents, such as, for example, methyl alcohol, ethyl alcohol, or acetone.

Commercial silica gels, along with those gels prepared in the laboratory in the conventional manner from commercial sodium silicate (water glass) usually contain appreciable amounts of aluminum. This aluminum, even when present only in minute amounts, has been found to impart a significant catalytic effect to the silica gel. In fact, in other processes where catalytic activity is desired, it is a generally accepted practice to purposely increase the aluminum content of silica gel whereby the catalytically enhanced material resulting therefrom has found manifold applications in such reactions as the cracking of gas oils or pure hydrocarbons, polymerization, isomerization, and other refining operations.

However, in separating various constituents of mixtures in common solution, such as, for example, conjugated diene hydrocarbons, into fractions or components by means of chromatographic adsorption on silica gel, the dienes are found to polymerize when commercial silica gels are used. Accordingly, non-catalytic silica gel would be desirable when the final separated products are to undergo substantially no changes other than those consonant with physical separation, and, when it is desired to avoid appreciable losses of valuable materials of a predetermined boiling range. In particular, during petroleum refining operations, it is of substantial economic advantage to utilize processes wherein the volume of useful product, conveniently identified by a specific boiling range, is maintained at a maximum in relation to the volume of feed stock treated therein. Separations formerly attempted by means of conventional silica gel adsorptive processes are objectionable when considered from this point of view.

It is, therefore, an object of the present invention to provide a refining process whereby hydrocarbon materials may be separated from each other and from other materials with which they may be in common solution, and wherein polymerization of unsaturated organic materials, such as conjugated dienes, is eliminated throughout said process and volume losses normally encountered are effectively diminished.

It is a further object of the present invention to provide an adsorbent material which is suitable for chromatographic adsorption separation processes wherein the catalytic activity usually resulting from the use of conventional silica gel is objectionable. It is an object of a specific adaptation of the invention to provide a process for removing undesired non-hydrocarbons from petroleum fractions containing readily polymerizable, but valuable, hydrocarbons.

It is a still further object of the present invention to provide a process for manufacturing a substantially non-catalytic silica gel adsorbent material suitable for chromatographic separation processes.

Other objects of this invention will be apparent from a consideration of the following more detailed description.

In accordance with the present invention, it has been found that an adsorbent material comprising silica gel, though contaminated with aluminum, may be made substantially inactive catalytically when ions of alkali or alkaline earth metals are present. These ions may be from each and every alkali or alkaline earth element, all or singular, and in any possible combination thereof.

Since commercial silica gel is almost invariably contaminated with aluminum impurities, it is more feasible both practically and economically to subject said gel to the treatment of the present invention rather than to attempt a quantitative removal of the aluminum contaminants.

It has also been found that by contacting commercial silica gel with a strong aqueous solution containing alkali or alkaline earth metal ions, or a mixture thereof, the catalytic activity is substantially eliminated, while the normal adsorption and separation properties of the gel remain relatively unchanged. The minimum amount of ions required to be present to produce a non-catalytic silica gel is extremely small and may be considerably less than even the trace quantities of aluminum present; although to effectively introduce this small amount of ions, it is advantageous to treat the gel with much larger quantities of the ions. Thus, while a dilute solution containing as little as 1% or less or an alkali or alkaline earth metal salt may produce satisfactory results, the introduction of the ions is more readily effected by the use of a concentrated, or even saturated, solution.

By means of silica gels prepared in this manner, catalytic activity, such as that which results in the polymerization of dienes, is prevented during chromatographic separations; and said separations are readily accomplished with no appreciable volume losses.

The invention may be more readily understood from the following example illustrating the same:

*Example.*—In order to treat a catalytic naphtha fraction to remove certain undesirable constituents, such as certain nitrogen and sulfur compounds, the following procedure was employed: A fresh portion of commercial silica gel of about 80–100 mesh was contacted, preferably by soaking overnight, with a 15% aqueous solution of sodium chloride. The gel was then washed several times by decantation, and finely dried at about 300° F. The resulting gel was found to have the following characteristics:

| | Weight percent |
|---|---|
| Aluminum (on ignited basis, 1100° F.) | 0.15 |
| Iron | 0.05 |
| Alkali or alkaline earth | 0.022 |
| Loss on ignition | 1.00 |

This specially treated silica gel was then loosely packed into a vertical column 174 cm. long and accommodating 1,826 grams of adsorbent material having a total volume of 2,800 cc. The charge stock used in this example was a heavy catalytically cracked naphtha fraction which had the following characteristics:

| Boiling range: | |
|---|---|
| Initial boiling point (° F.) | 278 |
| End point (° F.) | 405 |
| Gravity (° API) | 37.2 |
| Bromine number | 43.2 |
| Maleic anhydride number | 17.7 |
| Unsaturates and aromatics (%) | 60.0 |
| Nitrogen (%) | 0.043 |
| Sulfur (%) | 0.40 |
| Phenolic type compounds (%) | 0.4 |
| Hydroxyl groups as phenols (%) | 0.1 |

This charge stock was passed through the column at the rate of about 600 cc. per hour. In order to force the charge through the column at this rate, as well as to minimize oxidation throughout the separation process, nitrogen gas under a pressure of about 2–3 p. s. i. g. was used.

The process was carried out in a continuous fashion until the phenolic content of the effluent was the same as in the original charge, indicating that the column was becoming saturated with constituents of greater affinity toward the silica gel. At this point a total of 33,280 cc. were collected as effluent from the column. Pentane was then used to wash the column, and finally acetone was passed through the adsorbent to remove those materials still retained by the gel. The washings were collected and the solvents evaporated therefrom. About 350 cc. of a very dark colored material remained as residue from the evaporated solvent. Analysis of the extracted material showed removal of the following impurities from about 33,600 cc. of charge stock:

| | Grams |
|---|---|
| Sulfur | 1.6 |
| Nitrogen | 6.1 |
| Hydroxyl groups (as phenol) | 45 |

A similar procedure was followed using commercial silica gel as adsorbent, for comparison. Samples of charge stock, effluent from the sodium silica gel separation treatment were analyzed for diene content by the conventional maleic anhydride number method. The results are tabulated for comparison:

| Charge Stock | Sodium- Silica Gel | Commercial Gel |
|---|---|---|
| 17.7 | 17.7 | 6.0 |

Generally speaking, the maleic anhydride number is a measure of the conjugated diene content. Since conjugated dienes are the most readily polymerized materials present, the above data clearly show that the present process involving the use of specially prepared silica gel affords a means of preserving all the dienes in an unpolymerized state while removing certain undesired constituents, as distinguished from the conventional separation which causes substantial catalytic polymerization and results in loss of valuable constituents, including dienes. Furthermore, it has been found that the effluent from chromatographic adsorption treatment by means of the specially treated silica gel is a quality naphtha which is useful for blending into commercial gasoline. The gasoline resulting therefrom has excellent freedom from gum formation, even upon extended storage, and can be used to advantage where engine cleanliness is desired.

It will be appreciated that since polymerization is substantially prevented by the present invention, volume losses in a desired gasoline blending stock may be prevented while refining such stock chromatographically to remove undesired components. Also, by means of the hereindisclosed separation process, the feed stocks are no longer converted into materials which may either decrease the rate of flow through the column because of polymerization or other equally deleterious catalytic reactions, or contaminate the finally separated products with undesirable waste materials.

Obviously, many modifications and variations of the invention may be made without departing from the spirit and scope thereof. For example, chromatographic separations are widely used in such fields as both pure and applied organic chemistry, biochemistry, and physiology. They are applied specifically to naturally occurring pigments, synthetic dyestuffs, vitamins, hormones, and numerous other separation processes including those relating directly to the refining of petroleum. Various substitutions and modifications of apparatus, procedure, eluents, and so forth may be made in conformity with the breadth of the present invention. For example, it may be a preferred practice to remove the silica gel adsorbent material from the column and then separate the fractions therefrom, without use of an additional eluent. Another embodiment of the present invention may be found in a fluidized bed silica gel adsorbent medium, such as in commercial separation procedures using continuous flow operations. Thus, it is readily apparent that this invention has manifold applications and, therefore, is not to be limited by any theory as to mode of operation or manufacture, or by any specific example or description, but only as set forth in the appended claims.

I claim:

1. In combination with a process wherein undesirable non-hydrocarbons including nitrogen and sulfur compounds are removed from a cracked naphtha containing readily polymerizable dienes by contacting the naphtha with an adsorbent silica gel consisting essentially of hydrated $SiO_2$ but containing aluminum impurities which catalytically polymerize said dienes during said contacting, the method of removing said non-hydrocarbons from said naphtha while avoiding polymerization of said dienes, which consists essentially of contacting said adsorbent silica gel with an aqueous solution containing a substantial quantity sufficient to eliminate the catalytic polymerizing activity of said aluminum, of ions of a metal selected from the group consisting of alkali and alkaline earth metals, washing and drying the thus treated adsorbent silica gel, then contacting the dried adsorbent silica gel with said naphtha until said gel has selectively adsorbed only said non-hydrocarbons, and removing treated naphtha including said dienes from contact with said gel.

2. The process of claim 1 wherein the cracked naphtha is a catalytically cracked naphtha.

3. The process of claim 1 wherein the naphtha is passed through a bed of the treated adsorbent silica gel until the gel is saturated with the non-hydrocarbons.

4. The process of claim 1 wherein the metal is an alkali metal.

5. The process of claim 1 wherein the metal is sodium.

6. The process of claim 1 wherein the aqueous solution consists essentially of approximately 15% sodium chloride in water.

References Cited in the file of this patent

UNITED STATES PATENTS

| | | |
|---|---|---|
| 1,945,534 | Rembert | Feb. 6, 1934 |
| 2,045,097 | Otting | June 23, 1936 |
| 2,464,311 | Hiatt et al. | Mar. 15, 1949 |
| 2,475,253 | Pierce | July 5, 1949 |
| 2,490,260 | Ehrhardt | Dec. 6, 1949 |
| 2,649,420 | MacLean | Aug. 18, 1953 |

FOREIGN PATENTS

| | | |
|---|---|---|
| 380,486 | Great Britain | Sept. 16, 1942 |

OTHER REFERENCES

Mantell: Adsorption, McGraw-Hill Book Co., Inc., New York (1945), page 167.

Cassidy: Adsorption and Chromatograph (Interscience Pub. New York), 1951, pp. 196–197.